United States Patent Office 2,802,087
Patented Aug. 6, 1957

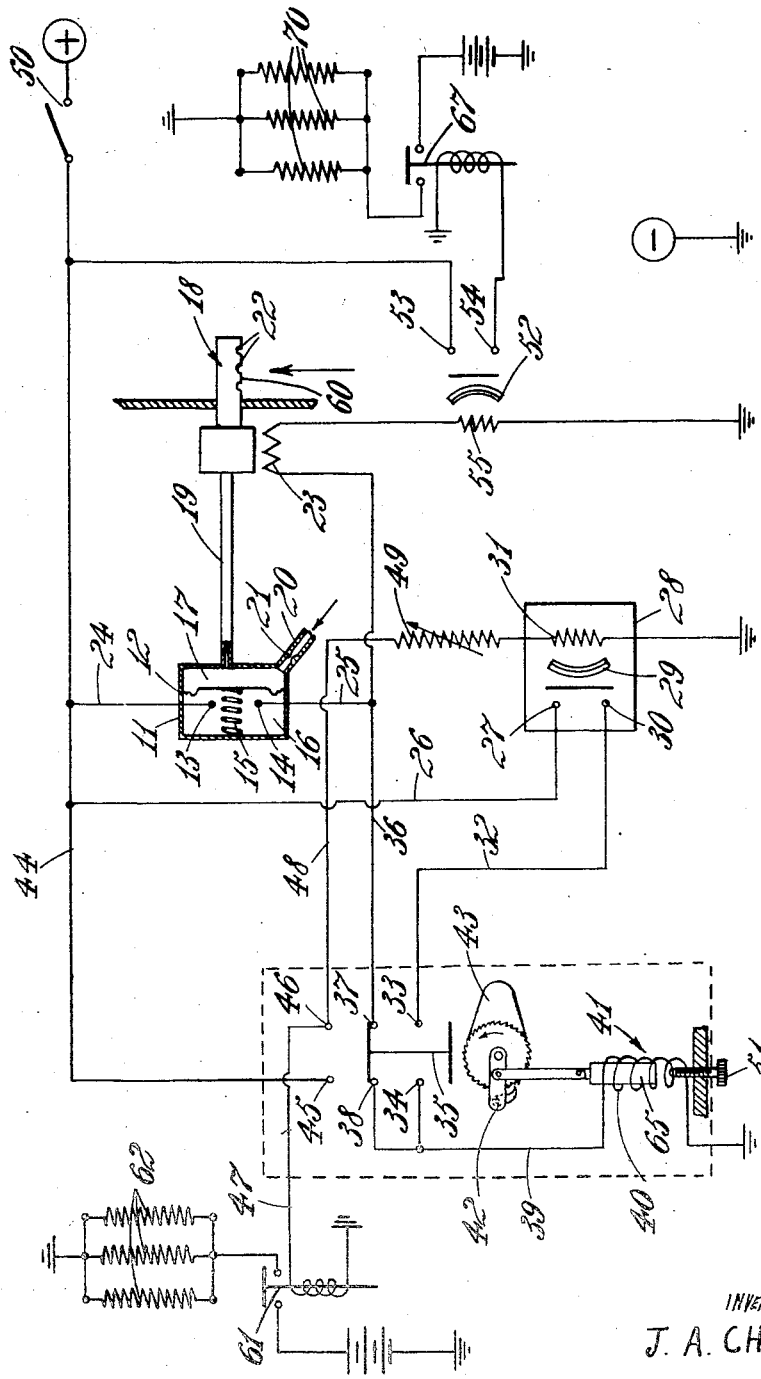

2,802,087
CONTROL MEANS FOR ELECTRO-THERMAL DE-ICING SYSTEMS

John Alfred Chilman, Gloucester, England, assignor to Rotol Limited, Gloucester, England, a British company Application June 13, 1955, Serial No. 515,137

Claims priority, application Great Britain June 16, 1954

11 Claims. (Cl. 219—20)

This invention relates to an electro-thermal de-icing control system for an aerial vehicle, which system is of the kind in which, under icing conditions, electrical current is supplied to a plurality of electro-thermal de-icing elements in the form of resistance type heater mats which are secured to the vehicle where de-icing is required, for example to the leading edge of an airscrew blade or to the leading edge of a wing, fin, tailplane or the like.

In operating such a system, it is desirable, in the interest of economy of heating power, to cause as much of the ice as possible to be "shed" from the surface of the vehicle in the solid state by merely melting from time to time a thin layer between the body of the ice and the vehicle so that the ice becomes detached. To ensure shedding, it is sometimes necessary to divide the surface into areas from which solid ice can be shed by the available forces (aerodynamic, centrifugal or gravitational) by "breaker" strips which are continuously heated so that ice cannot form upon them. Generally speaking, such breaker strips are not necessary in the case of propellers, from which the ice is readily shed by the centrifugal forces developed.

The thickness of ice which can be allowed to accumulate before being shed can be determined by reference to the effect which such an accumulation has upon the performance of the vehicle, and an optimum shedding thickness can be determined by balancing the cost of the de-icing power consumption against the cost of the loss of performance, the result being characteristic of the particular vehicle.

It is also known, that for a given thickness of ice and when using a particular power input for intermittently heating the parts of the vehicle surface between the breaker strips, the time taken from the switching-on of the current to the shedding of the ice increases as the temperature of the ambient air decreases.

The object of the present invention is to provide a simple control system whereby the heating "on" intervals are automatically controlled to increase in length as the temperature of the ambient air decreases, and the heating "off" intervals are automatically controlled to permit a predetermined thickness of ice to accumulate.

According to the invention, the control system comprises a heating current control including a heating current control switch, and actuating means actuable by one signal pulse to move said heating current control switch from an "on" position in which heating current is supplied to the de-icing element to an "off" position in which no heating current is supplied to the de-icing element, and by at least one further signal pulse to move said heating current control switch back to its "on" position, a temperature responsive switch for location in a zone at ambient temperature, said temperature responsive switch including an electrical heating element, and a pair of switch contacts which are closed only at switch temperatures above a selected value higher than 0° C., first circuit connection means for supplying current to the heating element of said temperature responsive switch when said heating current control switch is in its "on" position, and second circuit connection means, including a switch which is closed when said heating current control switch is in its "on" position, for transmitting a signal pulse to said actuating means when said temperature responsive switch contacts close, an ice detecting device including means for transmitting signal pulses to said actuating means at a frequency substantially proportional to the rate of ice accumulation on an ice-receiving part of said device arranged for location at a position in the relative airstream over the vehicle, in which position it will be subjected to icing when icing conditions exist, switch means for automatically disconnecting said signal pulse transmitting means from said actuating means when said heating current control switch is in its "on" position and for automatically connecting said signal pulse transmitting means with said actuating means when said heating current control switch is in its "off" position.

Preferably, said ice-detecting device comprises a fluid pressure operated switch, operable when a predetermined amount of ice has accumulated on said ice-receiving surface to transmit a signal pulse to said actuating means.

When this preferred feature is adopted arrangements must be made to de-ice said ice-receiving surface and in a case where the system is so arranged that each signal pulse produced by said pressure operated switch causes said heating current control switch to be moved from its "off" to its "on" position, it may be arranged that said ice-receiving surface be de-iced by the electro-thermal de-icing element, the supply of current to which the system is used to control, each time the pressure-operated switch is operated.

Where the pressure operated switch requires to produce more than one signal pulse before the actuating means of the heating current control will move the heating current control switch from its "off" to its "on" position, a separate electrical heating element is provided to de-ice the ice-receiving surface each time the pressure operated switch is operated.

One embodiment of the invention will now be described by way of example with reference to the accompanying drawing, which shows a schematic diagram of a system according to the invention.

Referring to the drawing, a pressure operated switch 11 constituting a signal pulse transmitting means comprises a diaphragm 12 which is normally urged away from a pair of contacts 13 and 14 by a coil spring 15, these contacts being disposed within a sealed chamber 16 on the left hand side of the diaphragm 12 in the drawing. A chamber 17 on the right hand side of the diaphragm communicates with a chamber 18 through a pipe 19.

The chamber 18 is fitted externally of the vehicle in the relative airstream, over the vehicle. The chamber 17 is pressurised with air in any convenient manner through a pipe 20 having a restrictor 21. The chamber 18 is provided with a number of orifices 22 which face upstream in the relative airstream over the vehicle, the air supplied to chamber 17 normally passing through pipe 19 and these orifices to atmosphere. It will be understood that pressure air supplied to the chamber 17 is sufficiently high to overcome the pressure of the airstream.

A lead 24 from the positive side of an electrical power source connects with the contact 13 in the pressure switch 11. It is arranged that when the spring 15 is overcome by the pressure air acting on the diaphragm when the orifices 22 are blocked by ice, the diaphragm moves to the left and bridges contacts 13 and 14. A lead 25 passes from contact 14 to an electric heating element 23 and back to earth. The element 23 is arranged so that when it is heated it de-ices the outer surface 60 of the wall of the chamber 18 (i. e. the ice-receiving surface) at least in the region of the orifices 22, thereby freeing the orifices from accumulated ice. The orifices 22 become blocked sufficiently to cause the contacts 13, 14 to be bridged when a layer of ice of definite thickness has accumulated on the surface 60, and this completes a circuit which brings the heating element 23 into operation to de-ice the surface 60. Consequently the cycle of icing and de-icing is continuously repeated at a frequency which is substantially proportional to the rate of ice accumulation.

A lead 26 from the positive side of the electrical power source connects with a contact 27 on a temperature-responsive switch 28. This switch is subjected to the ambient air temperature and comprises a bi-metallic strip 29 which is arranged to close contact 27 with a second contact 30 when it has been heated by a heating element 31 to a predetermined temperature, which must be above the highest temperature at which icing can occur, that is to say, above 0° C.

Contact 30 is connected via lead 32 to a contact 33 which is one of a pair of contacts 33, 34 associated with a heating current control switch in the form of a pulse-operated switch 35 which has an "on" position when a pair of contacts 45, 46 are bridged to energise a relay 61, to supply heating current to the electro-thermnal de-icing elements 62 of the vehicle. In the "on" position of the switch 35 the contacts 33, 34 are also bridged. A second lead 36 branches from lead 25 and connects with contact 37 which is one of a pair of contacts 37, 38 also associated with the switch 35 and bridged in the "off" position of the latter. Contacts 34 and 38 connect through the same lead 39 with the coil 40 of a solenoid 41 the armature 65 of which is arranged to effect step by step operation of the switch 35, in the example being described, by a ratchet mechanism shown diagrammatically at 42. The arrangement of the switch 35 is such that after the solenoid has been operated a predetermined number of times, a cam 43 automatically changes the switch from its "off" to its "on" position so that contacts 37 and 38 are opened and contacts 33, 34 and 45, 46 are closed.

A lead 44 from the positive side of the power source connects with the contact 45 which, when the pulse operated switch 35 is in its "on" position is closed with the contact 46. A lead 47 connects contact 46 with the relay 61 controlling the supply of heating current to the elements 62 which are in the form of resistance heater mats which are secured to the surface to be de-iced.

A second lead 48 connects contact 46 with a "shedding time control" in the form of a variable resistance 49 and with the heating element 31 of the temperature-responsive switch 28 so that the element 31 is switched on simultaneously with the elements 62.

The whole circuit is provided with an isolator switch 50.

In operation, assuming that the switch 35 has just been operated to move from its "on" to its "off" position, the orifices 22 become blocked by ice under icing conditions and consequently the air pressure builds up in chamber 17. As a result the diaphragm 12 moves to the left against the pressure of coil spring 15 and closes contacts 13 and 14 thereby completing the circuit to the heating element 23 which de-ices the surfaces 60. At the same time, current passes via leads 25, 36 contacts 37 and 38 and lead 39 to the coil 40 of the solenoid 41. This results in one pulse being applied to the pulse operated switch 35 which, however, in the arrangement being described, remains "off." The surface 60 is quickly de-iced, thus freeing the orifices 22, and the diaphragm 12 moves to the right opening contacts 13 and 14 and isolating the heating element 23 and solenoid coil 40. Ice consequently reforms on the surface 60 and the cycle is repeated with a frequency depending on the severity of the icing conditions.

The stroke of the armature 65 of the solenoid 41 is adjusted by means of a screw abutment 51 so that when a number of pulses has been applied, after the switch 35 has been moved to its "off" position, the number of pulses being determined according to the permissible thickness of ice accumulation on the surface to be de-iced, the cam 43 will have been rotated by the pulse mechanism to the "on" position of the pulse operated switch 35. This opens contacts 37, 38 and closes contacts 33, 34 and 45, 46. It will be understood that the orifices 22 continue to be periodically de-iced by the heater 23 but since contacts 37, 38 are now open the solenoid 41 is no longer operated by the pulses generated by the movements of the diaphragm 12.

The closing of contacts 45, 46 by the pulse operated switch 35 permits current to pass from the positive side of the power source via leads 44 and 47 to the relay 61 which is operated to supply heating current to the heating elements 62. The period during which the elements 62 are supplied with current has, however, to be regulated according to the temperature of the ambient air to ensure shedding of the ice. Such regulation is effected by the temperature-responsive switch 28 in the following manner.

When current commences to pass to the elements 62 it also passes through contact 46 and via lead 48 to the heating element 31 in the temperature-responsive switch 28, and the element 31 commences to heat the bi-metallic strip 29. The lower the ambient temperature then the longer the period required for the element 31 to heat the bi-metallic strip to its operating temperature at which it closes the contacts 27 and 30. When the contacts 27 and 30 are closed, current passes via lead 32, contacts 33, 34 and lead 39 to the coil 40 of the solenoid 41. Operation of the solenoid rotates the cam 43 by one step, and this single step is arranged to change the pulse-operated switch 35 from its "on" to its "off" position, thereby opening contacts 45, 46 and de-energising the relay 61 so that the current to the heating mats is cut off, and closing contacts 33 and 34 so that the pulse-operated switch 35 again comes under the control of the ice detecting device comprising the pressure-operated switch 11 and the chamber 18.

The variable resistance 49 is adjusted on installation of the apparatus so as to set the heating rate of the element 31 to accord with the shedding time characteristics of the heating mat installation composed of the elements 62.

The pulse mechanism of the switch 35 has been shown diagrammatically as a mechanical ratchet system. Alternatively, however, the mechanical ratchet system may be replaced by a "uniselector" electrical switching system of any convenient known form in which the number of pulses necessary to actuate the pulse operated switch 35 back to the "on" position after it has been moved to its "off" position can be selected by means of an auxiliary switch.

Maximum sensitivity of the ice-detecting device is obtained when this latter is arranged to respond to a small thickness of ice on the surface 60 and it is, therefore, preferred to arrange for the interval between successive "on" positions of the pulse-operated switch 35, that is to say, the permitted "icing-up" period, to correspond to several signal pulses from the pressure-operated switch 11. In principle, however, it is possible to make the ice-detecting device respond at an ice thickness corresponding to the maximum permissible thickness on the surface to be de-iced, in which case, the pulse-operated switch would be moved from the "on" position back to the "on" position by a signal pulse from the temperature-responsive switch followed by a single signal pulse from the pressure-operated switch 11.

When the de-icing installation includes continuously heated breaker strips 70 the ice-detecting device can also be used to control automatically the supply of heating current to the breaker strips while icing conditions are being encountered. For this purpose, for example, the signal pulses produced by the switch 11 may be used to energise a thermal delay switch 52 having a pair of contacts 53, 54 controlling a relay 67 for the breaker strip heating current.

The thermal delay switch includes a heating element 55 in series with the heating element 23 of the ice detector and is arranged so that so long as signal pulses are produced by the switch 11 at more than a predetermined minimum rate the pair of contacts 53, 54 remains closed. If the rate of icing-up of the surface 60 falls below that corresponding to this minimum rate the breaker strips will also be intermittently heated, but the heating periods will be sufficiently long to dispose of the small thickness of ice which will have accumulated.

I claim:

1. A system for automatically controlling the supply of heating current to an electro-thermo de-icing element on an aerial vehicle, which element is to be intermittently heated said system comprising a heating current control including a heating current control switch, and actuating means actuable by one signal pulse to move said heating current control switch from an "on" position in which heating current is supplied to the de-icing element to an "off" position in which no heating current is supplied to the de-icing element, and by at least one further signal pulse to move said heating current control switch back to its "on" position, a temperature-responsive switch for location in a zone at ambient temperature, said temperature-responsive switch including an electrical heating element, and a pair of switch contacts which are closed only at switch temperatures above a selected temperature higher than 0° C., first circuit connection means for supplying current to the heating element of said temperature-responsive switch when said heating current control switch is in it "on" position, and second circuit connection means, including a switch which is closed when said heating current control switch is in its "on" position, for transmitting a signal pulse to said actuating means when said temperature-responsive switch contacts close, an ice-detecting device including means for transmitting signal pulses to said actuating means at a frequency substantially proportional to the rate of ice accumulation on an ice-receiving part of said device arranged for location at a position in the relative air-stream over the vehicle, in which position it will be subjected to icing when icing conditions exist, switch means for automatically disconnecting said signal pulse transmitting means from said actuating means when said heating current control switch is in its "on" position and for automatically connecting said signal pulse transmitting means with said actuating means when said heating current control switch is in its "off" position.

2. A system as claimed in claim 1, wherein said ice-receiving part of said ice-detecting device is formed by an ice-receiving surface of a chamber, which surface has at least one orifice which faces upstream in the relative airstream over the vehicle when said ice-receiving part is located as aforesaid, and said ice-detecting device comprises a fluid pressure operated switch, and duct means to lead fluid to the switch, the arrangement being such that the fluid supplied to the switch normally passes from the switch into the relative airstream over the vehicle through said orifice, but when ice accumulates on said surface, at least in a quantity sufficient to restrict the area of said orifice, the increase of fluid pressure in said pressure operated switch actuates the switch and the switch thereby transmits a signal pulse to said actuating means.

3. A system as claimed in claim 2, wherein said ice-detecting device further comprises an electrical heating element for de-icing said ice receiving surface, and circuit connection means for supplying current to the electrical heating element when the pressure operated switch is closed, the electrical heating element being such that the ice-receiving surface is de-iced each time the pressure operated switch is closed.

4. A system as claimed in claim 1, wherein said actuating means comprises a selective electrical switching system including an auxiliary selection switch by adjustment of which the number of signal pulses necessary to move said heating current control switch back to its "on" position, after it has been moved to its "off" position, can be selected.

5. A system as claimed in claim 1 wherein said actuating means comprises a solenoid having a coil and armature, which solenoid is actuable by each signal pulse consequent upon the closing of the contacts of said temperature responsive switch to move said heating current control switch from its "on" position to its "off" position, and by at least one further signal pulse from said signal pulse transmitting means to move said heating current control switch from its "off" position to its "on" position.

6. A system as claimed in claim 5, wherein said actuating means further comprises a ratchet mechanism operable by said solenoid each time said solenoid is energised by a signal pulse to rotate a cam step by step, said cam being arranged to move said heating current control switch between its "off" and "on" positions.

7. A system as claimed in claim 6, wherein the stroke of said solenoid is adjustable to vary the number of signal pulses required for the solenoid to move said heating current control switch back to its "on" position after it has been moved to its "off" position.

8. A system as claimed in claim 7, wherein said cam is arranged to actuate said switch means and also the switch included in said second circuit connection means.

9. A system as claimed in claim 1, wherein a variable resistance is provided in series with the electrical heating element of said temperature responsive switch whereby the heating rate of the heating element may be adjusted to accord with the shedding time characteristics of the electro-thermal de-icing element which the system is to control.

10. A system as claimed in claim 1 for automatically controlling, in addition, the continuous supply of heating current to a breaker strip associated with said electro-thermal de-icing element while icing conditions are being encountered by the aerial vehicle, said system further comprising a thermal delay switch energisable by signal pulses transmitted by said signal pulse transmitting means of the ice-detecting device so as to remain closed so long as the signal pulses from said signal pulse transmitting means are produced at more than a predetermined minimum rate, said thermal delay switch when closed allowing a supply of heating current to pass to said breaker strip.

11. A system as claimed in claim 3, for automatically controlling, in addition, the continuous supply of heating current to a breaker strip associated with said electro-thermal de-icing element while icing conditions are being encountered by the aerial vehicle, said system comprising a thermal delay switch having a heating element in series circuit with said heating element for de-icing said ice receiving surface so that the heating element of the thermal delay switch is heated when said pressure operated switch is closed said thermal delay switch being held closed by the heat produced by its heating element so long as the pressure operated switch is opened and closed at more than a predetermined minimum rate, and when closed allowing a supply of heating current to pass to said breaker strip.

References Cited in the file of this patent

UNITED STATES PATENTS

| 2,373,255 | McGoldrick | Apr. 10, 1945 |
| 2,627,013 | McCabe | Jan. 27, 1953 |
| 2,675,456 | Cleminson et al. | Apr. 13, 1954 |
| 2,679,004 | Dyke et al. | May 18, 1954 |
| 2,775,680 | Flubacker | Dec. 25, 1956 |